US009024267B2

(12) United States Patent
Kawauchi et al.

(10) Patent No.: US 9,024,267 B2
(45) Date of Patent: May 5, 2015

(54) RADIOACTIVE RAY DETECTOR CARD

(75) Inventors: Hidetaka Kawauchi, Hitachi (JP);
Yoshinori Sunaga, Hitachinaka (JP);
Isao Takahashi, Hitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 33 days.

(21) Appl. No.: 13/812,303

(22) PCT Filed: Jul. 28, 2011

(86) PCT No.: PCT/JP2011/067306
§ 371 (c)(1),
(2), (4) Date: Jun. 4, 2013

(87) PCT Pub. No.: WO2012/014991
PCT Pub. Date: Feb. 2, 2012

(65) Prior Publication Data
US 2013/0248726 A1    Sep. 26, 2013

(30) Foreign Application Priority Data

Jul. 29, 2010    (JP) .................................. 2010-170370

(51) Int. Cl.
*G01T 1/24*    (2006.01)
(52) U.S. Cl.
CPC .. *G01T 1/24* (2013.01); *G01T 1/243* (2013.01)
(58) Field of Classification Search
CPC ........................................................ G01T 1/24
USPC .............................. 250/336.1, 370.01, 370.09
See application file for complete search history.

(56) References Cited

U.S. PATENT DOCUMENTS 7,202,480 B2 *   4/2007   Yokoi et al. .............. 250/370.01
2008/0073544 A1 *   3/2008   D'Aillon et al. ......... 250/370.13
2010/0308230 A1   12/2010   Yanagita et al.

FOREIGN PATENT DOCUMENTS

JP    2002-311146 A    10/2002
JP    2005-109269 A    4/2005
JP    2008-211023 A    9/2008
(Continued)

OTHER PUBLICATIONS

Japanese Office Action, Japanese Patent Appln. No. 2010-170370, Dec. 2, 2014, 4 pp.

*Primary Examiner* — David Porta
*Assistant Examiner* — Faye Boosalis
(74) *Attorney, Agent, or Firm* — Volpe and Koenig, P.C.

(57) ABSTRACT

A radioactive ray detector card comprises semiconductor elements on a substrate, each having a plurality of first electrodes, provided on one of main surfaces thereof, and a second electrode, provided on other of main surfaces thereof; the substrate having first electrode wirings electrically connected with the plurality of first electrodes, and card edge portions, which transmit signals from the plurality of semiconductor elements to an external electric circuit; the second electrode corresponding to a second electrode identifier, for identifying the semiconductor elements; the first electrodes corresponding to first electrode identifiers, for identifying the plurality of first electrodes, respectively; and the first electrode wirings electrically connect between the first electrodes, corresponding to one of the first electrode identifiers on one semiconductor element of the plurality of semiconductor elements, and the first electrodes, corresponding to one of the same first electrode identifiers on the other semiconductor element.

16 Claims, 5 Drawing Sheets

(56) References Cited

FOREIGN PATENT DOCUMENTS

| | | |
|---|---|---|
| JP | 2009-139346 A1 | 6/2009 |
| JP | 2009-198343 A | 9/2009 |
| JP | 2009-222410 A | 10/2009 |
| JP | 2010-156671 A | 7/2010 |

* cited by examiner

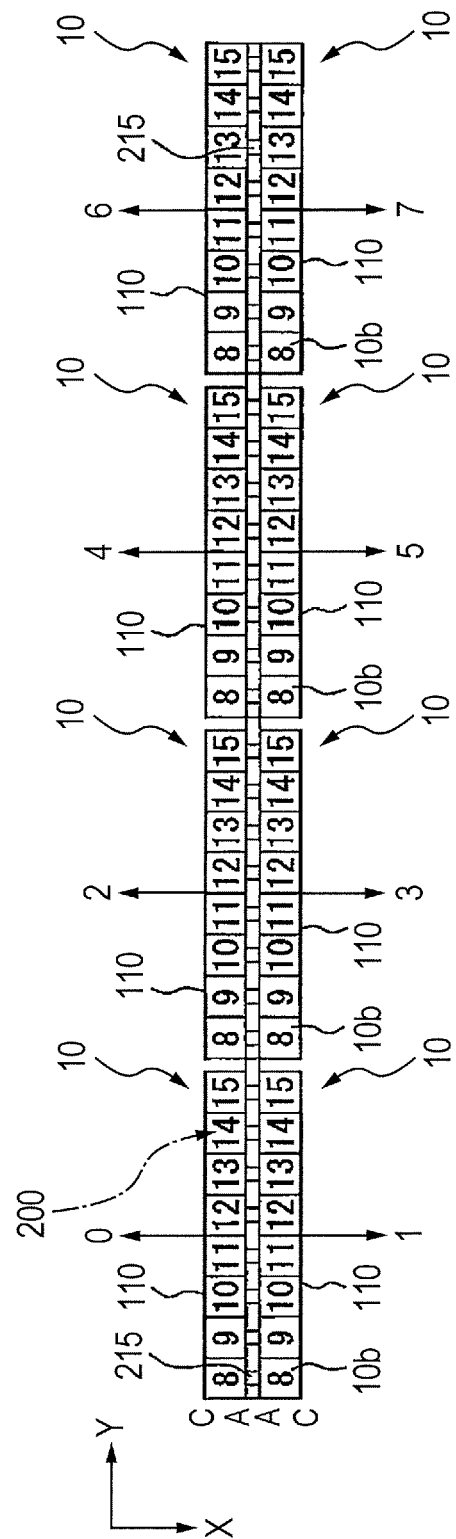

RADIOACTIVE RAY DETECTOR CARD

TECHNICAL FIELD

The present invention relates to a radioactive ray detector card. In particular, the present invention relates to a radioactive ray detector card for detecting radiations of gamma (γ) rays, X rays, etc.

BACKGROUND OF THE INVENTION

As a conventional radioactive ray detector is already known, in the following Patent Document 1, for example, a semiconductor radioactive ray detector, comprising a semiconductor element, an anode electrode attached on one surface of said semiconductor element, a cathode electrode attached on the other surface of said semiconductor element, and a signal line, one end thereof being connected with at least one of the anode electrode and the cathode electrode and the other end thereof extending straight from said electrode thereby to output a signal from that electrode.

PRIOR ART DOCUMENTS

Patent Documents

[Patent Document 1] Japanese Patent Laying-Open No. 2005-109269 (2005).

BRIEF SUMMARY OF THE INVENTION

Problem(s) to be Dissolved by the Invention

In a radioactive ray detecting apparatus described in the Patent Document 1 is provided a radioactive ray detecting unit, which is constructed with plural numbers of semiconductor radioactive ray detectors on the side of a detecting surface of a socket board mounting substrate, and is provided a measuring circuit unit for processing a radioactive ray detection signal on the opposite side of the socket board mounting substrate. According to the Patent Document 1, it is said, since that semiconductor radioactive ray detector is simplified in the wiring structure of signal lines in the periphery of the detector, it is possible to avoid a dead space generating due to the signal lines in the periphery of the detector when plural numbers of detectors are combined. As a result of this, it is said, plural numbers of the semiconductor radioactive ray detectors can be provided be dense or crowded, and thereby increasing the sensitivity of detection, as well as, enabling to remove unevenness due to joints. However, the semiconductor radioactive ray detecting apparatus according to the Patent Document 1, the wiring structure within the radioactive ray detecting unit can be easily complex; therefore, a further improvement of the wiring structure from an viewpoint of easiness of manufacturing comes up to be a problem to be dissolved.

Accordingly, an object of the present invention is to provide a radioactive ray detector card, for enabling to simplify the wiring structure between that plural numbers of semiconductor elements and electronics parts to be connected therewith, in an inside of the radioactive ray detector equipped with the plural numbers of semiconductor elements.

Means for Dissolving the Problem(s)

As one mode of the present invention is provided a radioactive ray detector card comprising plural numbers of semiconductor elements on a substrate, wherein each of said semiconductor elements has plural numbers of first electrodes, which are provided on one of main surfaces thereof, and a second electrode, which is provided on other of main surfaces thereof, wherein plural numbers of pixel regions are constructed, each being able to detect radioactive rays, between said plural numbers of first electrodes and said second electrode, respectively; said substrate has first electrode wirings to be electrically connected with said plural numbers of first electrodes, respectively, and card edge portions, which transmit signals from said plural numbers of semiconductor elements to an external electric circuit; said second electrode is corresponded to a second electrode identifier, for identifying said semiconductor elements, respectively; said plural numbers of first electrodes are corresponded to first electrode identifiers, for identifying said plural numbers of first electrodes, respectively; and said first electrode wirings electrically connect between said first electrodes, which are corresponded to one of said first electrode identifiers on one semiconductor element of said plural numbers of semiconductor elements, and said first electrodes, which are corresponded to one of said same first electrode identifiers on other one semiconductor element.

Also, according to the present invention, within such the mode as was mentioned above, the following improvement and/or change can be added thereto:

(i) Said substrate has an element mounting portion, on which said plural numbers of semiconductor elements are mounted, including plural numbers of element connector portions to be electrically connected with said plural numbers of first electrodes, respectively, a second electrode side electronic part mounting portion, for mounting thereon second electrode side electronic parts to be electrically connected with said second electrode, and a first electrode side electronic part mounting portion, being provided separating from said second electrode side electronic part mounting portion, for mounting thereon first electrode side electronic parts to be electrically connected with said first electrodes; said first electrode wirings electrically connect between said plural numbers of element connector portions and said first electrode side electronic parts; and said card edge portions include edge wiring patterns for transmitting the signals from said second electrode side electronic parts and said first electrode side electronic parts to said external electric circuit.

(ii) Said plural numbers of semiconductor elements are provided symmetrically on both surfaces of said substrate, by taking said substrate as a symmetric surface; and said first electrode wirings, which are provided on the one surface of said substrate, and said first electrode wirings, which are provided on the other surface of said substrate, are arranged so that they do not overlap with each other when seeing through said substrate from a front surface thereof.

(iii) Said edge wiring patterns of said card edge portions include a high-voltage terminal to be applied with high-voltage and plural numbers of low-voltage terminals to be applied with voltage lower than that of said high-voltage terminal; and distance between said high-voltage terminal and said low-voltage terminals is larger than distance between said plural numbers of low-voltage terminals.

(iv) A via hole is provided on said substrate; and said plural numbers of first electrodes of the one semiconductor element, which is provided on the one surface of said substrate, and said plural numbers of first electrodes of the semiconductor element, which is provided on the other surface of said substrate, at the position symmetric to said one semiconductor element, are electrically connected with through said via hole.

(v) Said external electric circuit identifies said pixel region, upon which said radioactive rays are incident, upon basis of a signal from said second electrode and a signal from one within said plural numbers of first electrodes.

Effect(s) of the Invention

According to the present invention, it is possible to provide a radioactive ray detector card, for enabling to simplify the wiring structure between that plural numbers of semiconductor elements and electronics parts to be connected therewith, in an inside of the radioactive ray detector equipped with the plural numbers of semiconductor elements.

BRIEF DESCRIPTION OF THE SEVERAL VIEWS OF THE DRAWING

FIG. 4 is a diagrammatical view for showing an outline of a method for reading out a signal from the radioactive ray detector card, according to the embodiment of the present invention.

EMBODIMENT(S) FOR CARRYING OUT THE INVENTION

Outlook of Structure of Radioactive Ray Detector Card 1

Figure 1A:
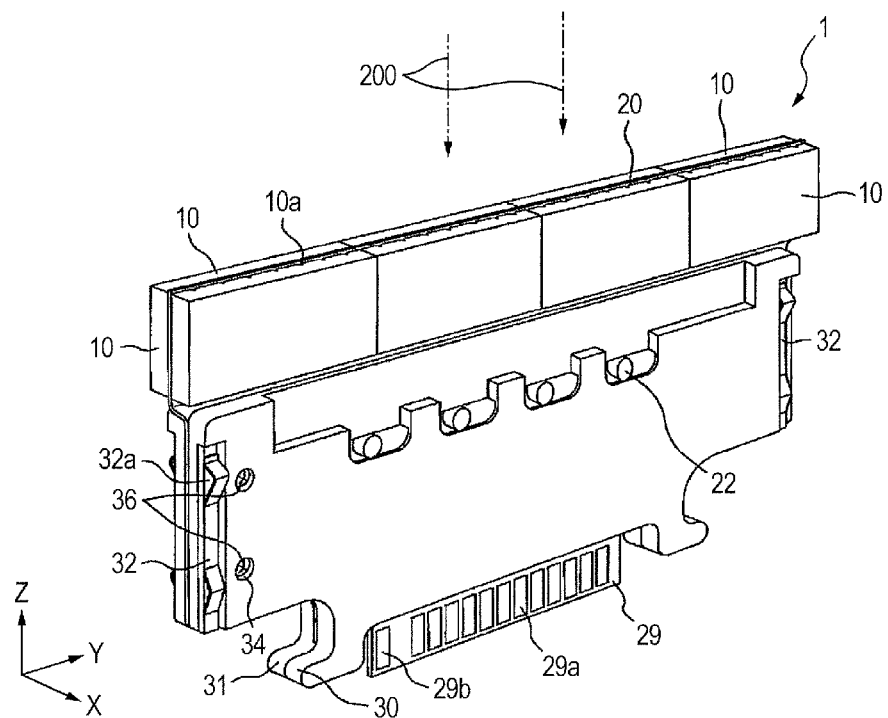
FIG. 1A is a perspective view for diagrammatically showing an example of a radioactive ray detector card, according to an embodiment of the present invention.

FIG. 1 is a diagrammatic perspective view for showing an example of a radioactive ray detector card, according to an embodiment of the present invention. The radioactive ray detector card 1 according to the present embodiment has a card-type configuration, and is a radioactive ray detector card for detecting radioactive rays 200, such as, the gamma (γ) rays, the X rays, etc. As is shown in FIG. 1A, the radioactive rays 200 propagate directing from an upper portion towards a lower portion in the figure. In other words, the radioactive rays 200 advance along with the direction directing from a semiconductor element 10 of the radioactive ray detector card 1 to card holders 30 and 31, and thereby reaching onto the radioactive ray detector card 1. And, the radioactive rays 200 are incident upon a side surface of the semiconductor element 10 of the radioactive ray detector card 1 (i.e., the surface facing to the above in FIG. 1A). Thus, the side surface of the semiconductor element 10 defines an incident surface of the radioactive rays 200. The radioactive ray detector card defining the side surface of the semiconductor element 10 as the incident surface of the radioactive rays 200, in this manner, is called an Edge-One type radioactive ray detector card, in the present embodiment.

However, the radioactive ray detector card 1 may be applies also as the Edge-One type radioactive ray detector card, being constructed by aligning plural numbers of the radioactive ray detector cards 1 for detecting the radioactive rays 200 through a collimator (for example, a matched collimator, a pin-hole collimator, etc.) having plural numbers of apertures, through which the radioactive rays 6 propagating along a specific direction (for example, the direction directing from an object to be detected to the radioactive ray detector 1).

In more details, the radioactive ray detector card 1 comprises a pair of semiconductor elements 10, facing to each other, each being able to detect the radioactive rays 200, a thin substrate 20 for mounting the semiconductor elements thereon, and the card holders 30 and 31, for supporting the substrate 20 by placing the substrate 20 between the neighboring portions of the pair of semiconductor elements 10 facing to each other. In FIG. 1, as an example of the present embodiment, there are four (4) sets of the pair of semiconductor elements 10 facing to each other, and are mounted on the substrate 20 so that they place the substrate 20 between them. In other words, the pair of semiconductor elements 10 of each of the sets are mounted at the positions, on one surface and the other surface of the substrate 20, respectively, being symmetrical to the substrate 20 as a symmetric surface.

The substrate 20 is supported while being positioned between the card holders 30 and 31. Though there is no particular limitation of the configurations between the card holders 30 and 31, however in FIG. 1, they are formed to the same configuration to each other. As a method for placing between them, for example, a projecting portion 36, which the card holder 31 has, is inserted into a hole 34 with groove, which the card holder 31 has, and also a projecting portion 36 (not shown in the figure), which the card holder 30 has, is inserted into a hole 34 with groove (not shown in the figure), which the card holder 30 has, and thereby supporting the substrate 20.

For enabling to support plural numbers of the radioactive ray detector cards 1, with stability, by inserting them into a radioactive ray detector card stand (not shown in the figure), an elastic member mounting portion 32a, being made from a plate spring, etc., is attached on the card holder 30 or 31, and the radioactive ray detector card 1 is pushed towards to the radioactive ray detector card stand, when the radioactive ray detector card 1 is inserted into the radioactive ray detector card stand. Also, preferably, the radioactive ray detector card stand has a connector, into which a card edge portion 29 can be inserted. The radioactive ray detector cards 1 is eclectically connected with external electronics parts (for example, an amplifier IC, a Field Programmable Gate Array (FPGA), etc.), when the card edge portion 29 thereof is inserted into that connector, so that the electrode of the connector is in contact with an edge wiring pattern 29a of the card edge portion 20.

Also, the radioactive ray detector card 1 can include, further, a flexible substrate having wiring patterns for electrically connecting between electrode patterns, which each semiconductor element 10 has, and plural numbers of substrate terminals 22, which are provided on the substrate 20, on an opposite side to the substrate 20 of the pair of semiconductor elements 10 facing to each other (however, the electrode patterns of the semiconductor element, the flexible substrate, the wiring patterns of the flexible substrate are not illustrated in the figure). The flexible substrate is provided on both, the side of one semiconductor of the pair of semiconductor elements 10 facing to each other, and the side of other semiconductor element thereof. For example, one end of the wiring patter of the flexible substrate can be connected with both, the side of the one semiconductor element 10 of the four (4) sets of the pairs of semiconductor elements 10, respectively, and the side of the other semiconductor elements, respectively. The other ends of the wiring patterns of the flexible substrate are electrically connected with the substrate terminals 22, respectively.

Details of Semiconductor Element 10

Figure 1B:
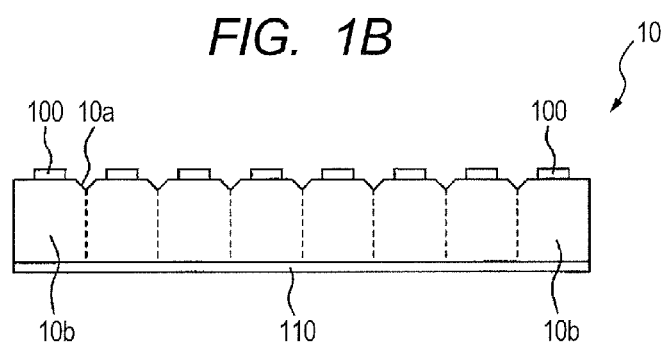
FIG. 1B is a side view for diagrammatically showing an example of a semiconductor element, which the radioactive ray detector card comprises therein, according to the embodiment of the present invention.

FIG. 1B is a side view for diagrammatically showing an example of a semiconductor element, which the radioactive ray detector card comprises therein, according to the embodiment of the present invention. The semiconductor element 10 is mainly made of a compound semiconductor, and has a thin and approximately cubic shape or a plane shape. Also, on one of the main surfaces of the semiconductor element 10 is formed plural numbers of first electrodes, and on the other main surface is formed second electrode. Hereinafter, in the present embodiment, explanation will be given upon an assumption that the first electrodes are anode electrodes 100 and the second electrode is a cathode electrode 110. However, it is also possible to make the first electrodes are cathode electrodes and the second electrode is an anode electrode.

As is shown in FIG. 2B, the semiconductor element 10 is provide with plural numbers of grooves 10a, upon which the radioactive rays are incident (i.e., an upper side surface, being the surface indicating thickness). Each groove 10a has a "V"-like configuration when seen from an upper side surface. Also, the semiconductor element 10 is fixed on the substrate 20, directing the main surface thereof, on which the grooves 10a are provided, to the substrate. In this instance, the anode electrodes 100, which are provided on the surface of the semiconductor element 10 between the plural numbers of grooves 10a, and element connector portions 26 provided on the surface of the substrate 10, which will be mentioned later, are connected with, through a conductive adhesive 50 (for example, a silver paste, etc.). With this, the semiconductor element 10 is electrically connected with the substrate 20 and also mechanically fixed thereon.

Also, the semiconductor element 10 defines plural numbers of pixel areas or regions 10b, each detectable the radioactive rays thereon, between the plural numbers of anode electrodes 100 facing to the cathode electrode 110 and that cathode electrode 110, respectively. In more details, the surface of the semiconductor element 10 to be incident with the radioactive rays thereon (i.e., an upper surface of the semiconductor element 10), being separated by an imaginary line, direction from each groove 10a perpendicular to a surface on an opposite side of the surface, on which the grooves 10 are provided, is the pixel area or region 10b. If the semiconductor element 10 has (n−1) pieces of grooves 10a, then (n) pieces pixel regions 10b are constructed with (herein, (n) is a positive integer). Each of the plural numbers of pixel regions 10b corresponds to one (1) piece of the pixels. With this, one (1) piece of the semiconductor element 10 has (n) pieces of the pixels.

As an example, in case where one (1) piece of the radioactive ray detector card 1 comprises eight (8) piece of the semiconductor elements 10 (i.e., four (4) sets of the pair of semiconductor elements 10), and each one (1) piece of the semiconductor elements 10 has eight (8) pixel regions 10b, respectively, the one (1) piece of the radioactive ray detector card 1 has a resolution power of 64 pixels. With increasing/decreasing the number of the grooves 10a, it is possible to increase/decrease the pixel number of the one (1) piece of the radioactive ray detector card 1.

As a material for building up the semiconductor element 10 can be applied CdTe. However, the semiconductor element 10 should not be limited to the CdTe element, as far as it can detect the radioactive rays, such as, the gamma (γ) rays, etc. For example, as the semiconductor element 10 can be also applied a CdZnTe (CZT) element, or a compound semiconductor element, such as, a $HgI_2$ element, etc.

Details of Substrate 20

Figure 2:
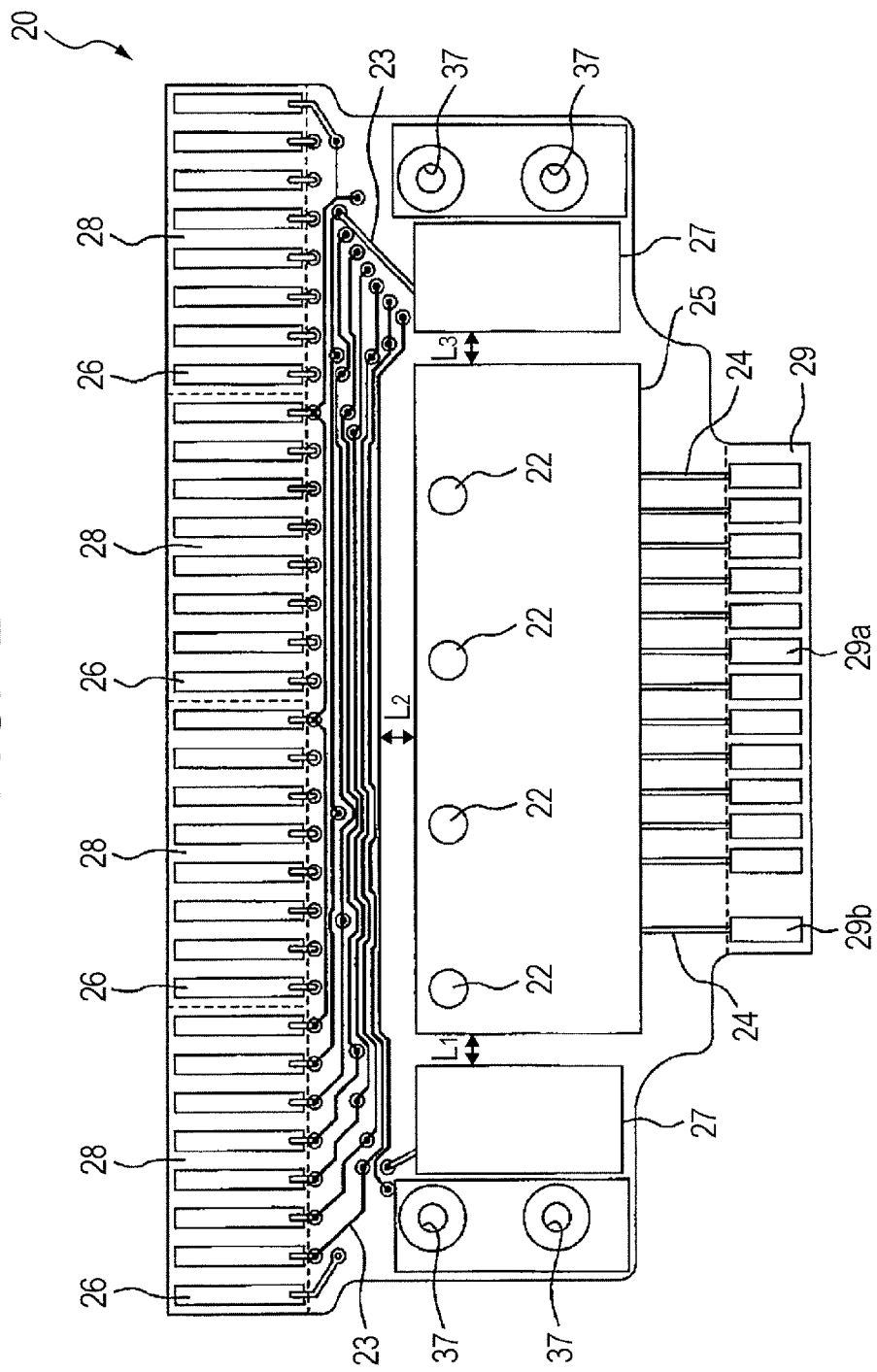
FIG. 2 is a front view for diagrammatically showing an example of a substrate, which the radioactive ray detector card comprises therein, according to the embodiment of the present invention.

FIG. 2 is a front view for diagrammatically showing an example of a substrate, which the radioactive ray detector card comprises therein, according to the embodiment of the present invention. As the substrate 20, it is preferable to be formed by putting a thin substrate (for example, a glass epoxy substrate, such as, FR4, i.e., Flame Retardant Type 4, etc.), on the surface of which a conductive thin film of a conducive material, such as, a metal conductor, etc., (for example, a copper foil) between insulation layers made of an insulating material, such as, a solder resist, etc., and thereby to have a flexibility. Penetrating holes 37 of the substrate 20 are holes, for the projecting portions 36, which are owned by the card holders 30 and 31, respectively, to pass therethrough.

The substrate 20 has an element mounting portion 28, on which the semiconductor elements 10 are mounted, and a card edge portion 29, for enabling connection of the signals from the semiconductor elements 10 with an external electric circuit. The card edge portion 29 is provided on a side opposite to that of the element mounting portions 28 on the substrate 20. Also, the substrate 20 has, between the element mounting portion 28 and the card edge portion 29, a second electrode side electronic part mounting portion 25 (or sometimes may be called, a cathode side electronic part mounting portion), on which second electrode side electronic parts to be electrically connected with the cathode electrode 110 (e.g., the second electrode) of the semiconductor element 10 should be mounted, and a first electrode side electronic part mounting portion 27 (or sometimes may be called, an anode side electronic part mounting portion), on which first electrode side electronic parts to be electrically connected with the anode electrode 100 (e.g., the first electrode) of the semiconductor element 10 should be mounted, being provided separating from that second electrode side electronic part mounting portion 25. As the second electrode side electronic part mounting portion 25 (or sometimes may be called, a cathode side electronic part mounting portion) and the first electrode side electronic part mounting portion 27 (or sometimes may be called, an anode side electronic part mounting portion) can be listed up, for example, electronic parts (not shown in the figure), such as, resistors and capacitors, etc., to which the signals from the semiconductor elements 10 are inputted.

There is no specific limitation in the manner of determining or providing the element mounting portion 28, i.e., an area or region may be determined for each of the semiconductor elements 10 to be mounted thereon, or may be determined as a whole, correctively, on which the plural numbers of semiconductor elements 10 should to mounted. In FIG. 2 is shown the example, in which an oblong-shaped element mounting portion 28 in a front surface view is determined for each of the semiconductor elements 10 to be mounted. When determining the element mounting portion 28 for each semiconductor element 10, in plural numbers thereof, for that plural numbers of the element mounting portions 28, it is preferable to be provided so that the short sides thereof are neighboring with each other.

Also, on the element mounting portion 28 are provided plural numbers of element connector portions 26, to be electrically connected with the plural numbers of anode electrodes 100 of the semiconductor element 10, respectively. In FIG. 2 is shown the example, wherein each of the element connector portions 26 has an oblong shape in the front surface view thereof, and long sides of that oblong shape are aligned directing to the direction perpendicular to the longitudinal direction of the element mounting portion 28. Also, each of the element mounting portions 26 is aligned along the longitudinal direction of the element mounting portion 28 at a predetermined distance therebetween. However, that predetermined distance corresponds to the distance of the plural numbers of anode electrodes 100, which are provided on the substrate 20 of the semiconductor element 10. On the surfaces of the plural numbers of element mounting portions are provided a conductive adhesive having conductivity (for example, a silver paste, etc.), so that the anode electrodes 100 of the semiconductor element 10 are electrically connected with the element mounting portions 26 through that conducive adhesive.

An end portion of each of the plural numbers of element connector portions 26, on the side of the card edge portion 29, is electrically connected with the plural numbers of first electrode wirings 23 (may sometimes called, an anode electrode(s)), respectively. Each of the anode wirings 23 is electrically connected with an anode side electronic part(s), which is/are mounted on the anode side electronic part mounting portion 27. With this, the anode electrode(s) 100 of the semiconductor element 10 and the anode side electronic part(s) of the anode side electronic part mounting portion 27 is/are electrically connected with, through the anode wiring(s) 23. Herein, the plural numbers of anode wirings are arranged in an area or region defined between the element mounting portion 28 and the anode side electronic part mounting portion 27. In FIG. 2 is shown the example, wherein main portions of the plural numbers of anode wirings 23 are formed, extending into the direction almost in parallel with the longitudinal direction of the element mounting portion 28.

The anode side electronic part mounting portion 27 is provided, so that it places the cathode side electronic part mounting portion 25 therebetween, at the position separating from the cathode side electronic part mounting portion 25 along the longitudinal direction of the substrate 20. In other words, a predetermined distance is provided between the cathode side electronic part mounting portion 25, on which the electronic part(s) to be applied with high-voltage, and the anode wiring(s) and the anode side electronic part mounting portion 27. In the example shown in FIG. 2, there is shown the example, in the front-side view of the substrate 20, wherein the distance between the left end of the cathode side electronic part mounting portion 25 and the right end of the anode side electronic part mounting portion 27, which is provided in the left direction of the cathode side electronic part mounting portion 25, is "L1", the distance between the right end of the cathode side electronic part mounting portion 25 and the left end of the anode side electronic part mounting portion 27, which is provided in the right direction of the cathode side electronic part mounting portion 25, is "L3", and the distance between an end of the anode side electronic part mounting portion 27 facing to the element mounting portion and an end of the anode wiring 23 facing to the car edge portion is "L2", respectively.

The substrate 20 has plural numbers of substrate terminals 22, each having a shape (for example, a column-like) projecting from the substrate 20, on the side of the cathode side electronic part mounting portion 25 facing to the element mounting portion 28. The substrate terminal 22 and the cathode electrode 110 are electrically connected with, through a wiring pattern, which a flexible substrate (not shown in the figure) has. With this, the cathode electrode 110 of the semiconductor element 10 and the edge wiring pattern 29a of the card edge portion 29 are electrically connected with.

The card edge portion 29 is a portion for transmitting signals from the cathode side electronic part(s) and the anode side electronic part(s) to the external electric circuit(s), and it has plural numbers of edge wiring patterns 29a, which are aligned along with the longitudinal direction of the card edge portion 29, and an edge wiring pattern 29b, which is provided on one end side of the card edge portion 29. In FIG. 2 is shown the example, wherein each of the plural numbers of edge wiring patterns 29a and the edge wiring pattern 29b has an oblong shape in the front surface view thereof, respectively, and they are aligned directing a long side of the oblong shape into the direction perpendicular to the longitudinal direction of the card edge portion 29.

The plural numbers of edge wiring patterns 29a are electrically connected with the anode side electronic parts, which are mounted on the anode side electronic part mounting portion 27, or the cathode side electronic part(s), which is/are mounted on the cathode side electronic part mounting portion 25. The edge wiring patterns 29a to be electrically connected with the anode side electronic parts transmit electric signals from the anode electrodes 100, while the edge wiring pattern(s) 29a to be electrically connected with the cathode side electronic part(s) transmit(s) an electric signal(s) from the cathode electrode 110. The edge wiring pattern(s) 29a to transmit the electric signal(s) from the cathode electrode 110 is/are electrically connected with the substrate electrodes 22 through the cathode side electronic part(s) mounted on the cathode side electronic part mounting portion 25 (for example, a capacitor).

The edge wiring pattern 29b is a high-voltage terminal for applying a high-voltage bias voltage onto the semiconductor element 10. The edge wiring pattern 29b is electrically connected with the cathode side electronic part(s) (for example, a resistor) mounted on the cathode side electronic part mounting portion 25, through the cathode wiring 24 and the substrate electrode 22.

Also, the edge wiring pattern 29b as the high-voltage terminal is provided at a position separating from an end of the edge wiring patterns 29a as the low-voltage terminals, through which the electric signals flow, having voltage lower than that of the bias signal. Thus, the distance between the edge wiring pattern 29b and the edge wiring pattern 29a, which is closest to the edge wiring pattern 29b, is determined to be larger than the distance between the plural numbers of edge wiring patterns 29a.

Details of Arrangement of Anode Wiring 23

Figure 3A:
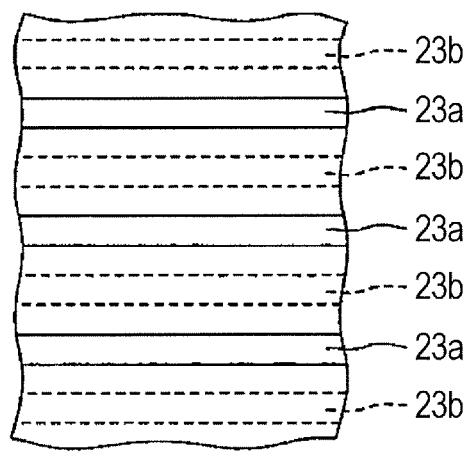
FIG. 3A is a partial enlarged diagrammatic front view for showing an example of arrangement of anode wirings of the radioactive ray detector card, according to the embodiment of the present invention.
Figure 3B:
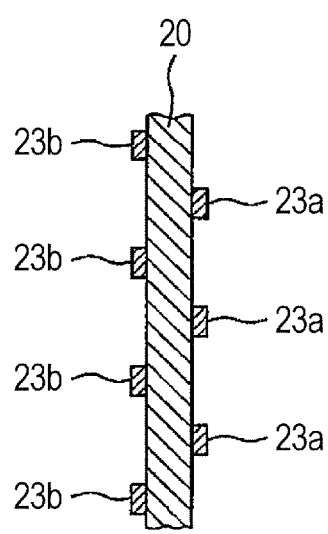
FIG. 3B is a partial enlarged diagrammatic front view of the anode wirings shown in FIG. 3A.
Figure 3C:
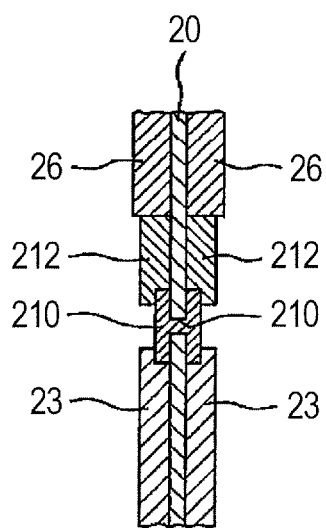
FIG. 3C is a partial enlarged diagrammatic front view for showing an example of a via hole, which is provided on a substrate of the radioactive ray detector card, according to the embodiment of the present invention, and also a peripheral portion thereof.

FIG. 3A is a partial enlarged diagrammatic front view for showing an example of arrangement of anode wirings of the radioactive ray detector card, according to the embodiment of the present invention. FIG. 3B is a partial enlarged diagrammatic front view of the anode wirings shown in FIG. 3A. Also, FIG. 3C is a partial enlarged diagrammatic front view for showing an example of a via hole, which is provided on a substrate of the radioactive ray detector card, according to the embodiment of the present invention, and also a peripheral portion thereof.

As is shown in FIG. 3A, the anode wirings 23 is made up with first anode wirings 23a, which are provided on one surface of the substrate 20, and second anode wirings 23b, which are provided on the other surface of the substrate 20. The first anode wirings 23a and the second anode wirings 23b are arranged so that they do not overlap each other when seeing through the substrate from the front surface thereof. In other words, as is shown in FIG. 3B, on the opposite side of the anode wirings 23a putting the substrate 20 therebetween are not arranged the anode wirings 23b. Since the anode wirings 23a and the anode wirings 23b are not arranged at the positions overlapping while putting the substrate 20 therebetween, it is possible to reduce a capacitance (i.e., a parasitic capacity) generating due to the anode wirings 23a, the substrate 20 and the anode wirings 23b.

On the other hand, the plural numbers of anode electrodes 100 of one (1) piece of the semiconductor element 10, which is provided on one surface of the substrate 20, and the plural numbers of anode electrodes 100 of the semiconductor element 10, which is provided at the position symmetric to that semiconductor element on the other surface of the substrate 20 are electrically connected with, through via holes 210, which are provided on the substrate 20. For example, as is shown in FIG. 3C, the substrate 20 has a penetrating conductive portion 215 for conducting between the one surface of the substrate 20 and the other surface thereof through the via hole 210, and a connector portion 212 for electrically connecting the penetrating conductive portion 215 and the element connector portion 212. Also the penetrating conductive portion 215 and the anode wiring 23 are electrically connected with.

Readout Method of Signal

Next, explanation will be given on readout of a signal from the radioactive ray detector card, according to the present invention, by referring to FIG. 4. This FIG. 4 is a diagrammatical view for showing an outline of a method for reading out a signal from the radioactive ray detector card, according to the embodiment of the present invention.

The cathode electrodes 110 are corresponded to or associated with second electrode identifiers (sometimes, may be called "cathode identifier(s)") for identifying the cathode electrodes 110, uniquely, for each of the plural numbers of semiconductor elements 10. In more details, as is shown in FIG. 4, "0" is corresponded to or associated with the cathode electrode 110 of the semiconductor element 10, which is mounted on one side end of the substrate 20, as the cathode identifier, among the plural numbers of semiconductor elements 10 mounted on one surface of the substrate 20. And, "1" is corresponded to or associated with the cathode electrode 110 of the semiconductor element 10, which is mounted on the position symmetric to that semiconductor element 10 while putting the substrate 20 therebetween. Hereinafter, the cathode identifiers are corresponded to or associated with the cathode electrodes 110 for all of the semiconductor elements 10. As an example, in case where the radioactive ray detector card 1 has eight (8) pieces of the semiconductor elements 10, the cathode identifiers from "0" to "7" are corresponded to or associated with the cathode electrodes 110, respectively. With doing this, one cathode identifier is corresponded to or associated with the cathode electrode 110 of the one semiconductor element 10, even when the plural numbers of pixel regions 10b are included in each of the plural number of the semiconductor elements 10.

Next, the plural numbers of anode electrodes 100 of the semiconductor element 10 are corresponded to or associated with first electrode identifiers (sometimes, may be called "cathode identifier(s)") for identifying the plural numbers of anode electrodes 100, respectively. As is shown in FIG. 4, for example, "8" is corresponded to or associated with the pixel region 10b at one side end of each semiconductor element 10, as the anode identifier, in case where one semiconductor element 10 has eight (8) pieces of the pixel regions 10b. Further, along the direction separating from that pixel region, the anode identifiers from "9" to "15", each for identifying each pixel region 10b, uniquely, are corresponded to or associated with the pixel regions 10b, respectively. Namely, combining the cathode identifiers and the anode identifiers enables a unique identification, for all of the pixel regions 10b.

As a result thereof, when the radioactive rays 200 are incident upon the radioactive ray detector card 1, according to the present invention, the external circuit(s) specifies the pixel region(s) 20b, upon which the radioactive rays 200 are incident, upon basis of the signal(s) from the cathode electrode(s) and the one anode electrode 100 within the plural numbers of anode electrodes 100. In other words, when the radioactive rays 200 are incident upon a certain pixel region 10b, the external circuit(s) of the radioactive ray detector card 1 reads out the cathode identifier and the anode identifier corresponding to that pixel region 10b, and thereby identifies upon which one of the pixel region 10b of which semiconductor the radioactive rays are incident. For example, in case where "0" is detected as the cathode identifier, and "14" is detected as the anode identifier, by the external circuit, then it is determined that the radioactive rays 200 are incident upon the pixel region 10b where the anode electrode 100 is provided corresponding to the anode identifier "14", which is the pixel regions 10b of the semiconductor element 10 having the cathode electrode 110 corresponding to the cathode identifier "0", by the external circuit.

In the present embodiment, the anode electrode 100, which is corresponded to or associated with one anode identifier (for example, "14"), in one semiconductor element 10, and the anode electrode 100, which is corresponded to or associated with the anode identifier same to that mentioned above (i.e., "14"), in other one semiconductor element 10, are electrically connected with the anode wiring 23. With this, there is no necessity of providing the respective anode wiring 23 and the respective edge wiring pattern 29a, for each of the pixel regions 10b of each semiconductor element 10. The anode electrodes 100, which are corresponded to or associated with a common anode identifier, are electrically connected with each other by a common anode wiring 23, and are electrically connected with the common edge wiring patterns 29a.

Effect of Present Embodiment

As was mentioned previously, in the radioactive ray detector card 1, according to the embodiment of the present invention, the anode identifiers, which are corresponded to or associated with the anode electrodes 100 for each pixel region 10b, are shared in common for each pixel region 10b of each semiconductor 10, and the anode electrodes 100, which are corresponded to or associated with the common anode identifier, are electrically connected with each other by the anode wirings 23. With this, it is possible to reduce a number of pieces of the anode wirings 23, dramatically.

For example, in case where the radioactive ray detector card has eight (8) pieces of the semiconductor elements 10, and each of the semiconductor elements 10 includes eight (8)

pieces of the pixel regions 10b, that radioactive ray detector card has 64 pieces of the pixel regions 10b. In this case, if the wiring is provided for each of the pixel regions 10b, it is necessary to provide 64 pieces of the anode wirings. However, in the radioactive ray detector card 1, according to the embodiment of the present invention, only one (1) piece of the cathode electrode 110 is provided on one semiconductor element 10, and the pixel regions 10b of the one pair of the semiconductor elements 10, which are provided while placing the substrate 20 therebetween, have the common anode electrode 100. Further, the anode electrodes 100, which are corresponded to or associated with one anode identifier in one semiconductor element, and the anode electrodes 100, which are corresponded to or associated with the same anode identifier mentioned above in other one semiconductor, are electrically connected with. Due to those, even if the radioactive ray detector card 1 has 64 pieces of the pixel regions, it is enough to form eight (8) pieces of the cathode wirings 24 and the eight (8) pieces of the anode wirings 23 on the substrate 20, and therefore it is possible to reduce the number of the wirings to be formed.

Also, since the radioactive ray detector card 1, according to the present embodiment, can reduce the number of pieces of the anode wirings 23 due to such structure as mentioned above, it is not necessary to mount the electronic parts (for example, a chip capacitor(s) and/or a chip resistor(s), etc.) corresponding to each of the pixel regions 10b on the substrate 20. Accordingly, since the radioactive ray detector card 1 is also able to reduce the number of electronic parts to be mounted on the substrate 20, there is no necessity of increasing the area of the substrate 20, and therefore it is possible to achieve small-sizing of the radioactive ray detector card 1, easily.

Also, since the anode electrodes 100 corresponded to or associated with the common anode identifier are electrically connected with each other by the anode wirings 23, and are connected with the common edge wiring pattern 29a, it is also possible to reduce the number of the edge wiring patterns 29a to be formed on the card edge portions 29. Accordingly, the radioactive ray detector card 1, according to the present embodiment, is able to reduce the number of the electric signals to be outputted to the external electronic part(s) to be electronically connected with, through the card edge portions 29. With this, it is also possible to lighten the load on the external electronic part(s).

In the above, although the explanation was given on the embodiment of the present invention; however, the present invention should not be limited only to the invention described in the claims. Also, it should be noted that all of combinations of the features explained within the embodiments are necessarily essential to the means for dissolving the problem(s) of the invention.

EXPLANATION OF MARKS

1 . . . radioactive ray detector card, 10 . . . semiconductor element, 10a . . . groove, 10b . . . pixel region, 20 . . . substrate, 22 . . . substrate terminal, 23, 23a, 23b . . . anode wiring (first electrode wiring), 24 . . . cathode wiring, 25 . . . cathode side electronic part mounting portion (second electrode side electronic part mounting portion), 26 . . . element connector portion, 27 . . . anode side electronic part mounting portion (first electrode side electronic part mounting portion), 28 . . . element mounting portion, 29 . . . card edge portion, 29a, 29b . . . edge wiring pattern, 30, 31 . . . cardholder, 32 . . . elastic member, 32a . . . elastic member mounting portion, 34 . . . hole with groove, 36 . . . projecting portion, 37 . . . penetrating hole, 100 . . . anode electrode (first electrode), 110 . . . cathode electrode (second electrode), 200 . . . radioactive rays, 210 . . . via hole, 212 . . . connector portion, 215 . . . penetrating conductive portion

What is claimed is:

1. A radioactive ray detector card comprising a plurality of semiconductor elements on a substrate having at least a first and a second main surface, comprising:

each semiconductor element has a plurality of first electrodes, which are provided on a first main surface, and a second electrode, which is provided on the second main surface, wherein a plurality of pixel regions are constructed, each being able to detect radioactive rays, between said plurality of first electrodes and said second electrode, respectively;

said substrate has first electrode wiring which is electrically connected with said plurality of first electrodes, and card edge portions, which transmit signals from said plurality of semiconductor elements to an external electric circuit;

said second electrode is corresponded to a second electrode identifier, for identifying said semiconductor elements, respectively;

said plurality of first electrodes are corresponded to first electrode identifiers, for identifying said plurality of first electrodes, respectively; and said first electrode wiring electrically connecting said first electrodes, which are corresponded to one of said first electrode identifiers on one semiconductor element of said plurality of semiconductor elements, and said first electrodes, which are corresponded to one of said same first electrode identifiers on another semiconductor element;

said substrate having an element mounting portion, on which said plurality of semiconductor elements are mounted, including a plurality of element connector portions to be electrically connected with said plurality of first electrodes, respectively, a second electrode side electronic part mounting portion, for mounting thereon second electrode side electronic parts to be electrically connected with said second electrode, and a first electrode side electronic part mounting portion, being provided separating from said second electrode side electronic part mounting portion, for mounting thereon first electrode side electronic parts to be electrically connected with said first electrodes;

said first electrode wiring electrically connecting said plurality of element connector portions and said first electrode side electronic parts; and said card edge portions include edge wiring patterns for transmitting the signals from said second electrode side electronic parts and said first electrode side electronic parts to said external electric circuit; said edge wiring patterns include a high-voltage terminal to be applied with high-voltage and a plurality of low-voltage terminals to be applied with voltage lower than that of said high-voltage terminal, and the distance between said high-voltage terminal and said low-voltage terminals is larger than distance between said plurality of low-voltage terminals.

2. The radioactive ray detector card, as described in claim 1, wherein said plural of semiconductor elements are provided symmetrically on both surfaces of said substrate, by taking said substrate as a symmetric surface; and said first electrode wiring, which is provided on the first surface, and said first electrode wiring, which is provided on the second surface, are arranged so that they do not overlap with each other when seeing through said substrate from said first or second surface thereof.

3. The radioactive ray detector card, as described in claim 2, wherein:
a via hole is provided on said substrate; and
said plurality of first electrodes of the one semiconductor element, which is provided on the first surface, and said plurality of first electrodes of the semiconductor element, which is provided on the second surface, at the position symmetric to said one semiconductor element, are electrically connected with through said via hole.

4. The radioactive ray detector card, as described in claim 3, wherein:
said external electric circuit identifies said pixel region, upon which said radioactive rays are incident, upon basis of a signal from said second electrode and a signal from one of said plurality of first electrodes.

5. The radioactive ray detector card, as described in claim 2, wherein:
said external electric circuit identifies said pixel region, upon which said radioactive rays are incident, upon basis of a signal from said second electrode and a signal from one within said plurality of first electrodes.

6. The radioactive ray detector card, as described in the claim 1, wherein:
a via hole is provided on said substrate; and
said plurality of first electrodes of one semiconductor element, which is provided on the first surface, and said plurality of first electrodes of the semiconductor element, which is provided on the second surface, at the position symmetric to said one semiconductor element, are electrically connected with through said via hole.

7. The radioactive ray detector card, as described in the claim 6, wherein
said external electric circuit identifies said pixel region, upon which said radioactive rays are incident, upon basis of a signal from said second electrode and a signal from one of said plurality of first electrodes.

8. The radioactive ray detector card, as described in claim 1, wherein:
said external electric circuit identifies said pixel region, upon which said radioactive rays are incident, upon basis of a signal from said second electrode and a signal from one of said plurality of first electrodes.

9. A radioactive ray detector card comprising a plurality of semiconductor elements on a substrate, wherein:
each of said semiconductor elements has a plurality of first electrodes, which are provided on one of main surfaces thereof, and a second electrode, which is provided on another of main surfaces thereof, wherein a plurality of pixel regions are constructed, each being able to detect radioactive rays, between said plurality of first electrodes and said second electrode, respectively;
said substrate has first electrode wiring to be electronically connected with said plurality of first electrodes, respectively, and card edge portions, which transmit signals from said plurality of semiconductor elements to an external electrical circuit;
said plurality of semiconductor elements are provided symmetrically on both surfaces of said substrate, by taking said substrate as a symmetric surface;
a via hole for electrical connection is provided on said substrate;
said plurality of first electrodes of the one semiconductor element, which is provided on the one surface of said substrate, and said plurality of first electrodes of the semiconductor element, which is provided on the other surface of said substrate, at the position symmetric to said one semiconductor element, are electrically connected through said via hole;
said second electrode is corresponded to a second electrode identifier, for identifying said semiconductor elements, respectively;
said plurality of first electrodes are corresponded to first electrode identifiers, for identifying said plurality of first electrodes, respectively; and
said first electrode wirings electrically connect between said first electrodes, which are corresponded to one of said first electrode identifiers on one semiconductor element of said plurality of semiconductor elements, and said first electrodes, which are corresponded to one of said same first electrode identifiers on the other one semiconductor element.

10. The radioactive ray detector card, as described in claim 9, wherein:
said substrate has an element mounting portion, on which said plurality of semiconductor elements are mounted, including a plurality of element connector portions to be electrically connected with said plurality of first electrodes, respectively, a second electrode side electronic part mounting portion, for mounting thereon second electrode side electronic parts to be electrically connected with said second electrode, and a first electrode side electronic part mounting portion, being provided separating from said second electrode side electronic part mounting portion, for mounting thereon first electrode side electronic parts to be electrically connected with said first electrodes;
said first electrode wiring electrically connect said plurality of element connector portions and said first electrode side electronic parts; and
said card edge portions include edge wiring patterns for transmitting the signals from said second electrode side electronic parts and said first elect rode side electronic parts to said external electric circuit.

11. The radioactive ray detector card, as described in claim 10, wherein:
said first electrode wirings, which are provided on the one surface of said substrate, and said first electrode wirings, which are provided on the other surface of said substrate, are arranged so that they do not overlap with each other when seeing through said substrate from a front surface thereof.

12. The radioactive ray detector card, as described in claim 11, wherein:
said external electric circuit identifies said pixel region, upon which said radioactive rays are incident, upon basis of a signal from said second electrode and a signal from one of said plurality of first electrodes.

13. The radioactive ray detector card, as described in claim 10, wherein:
said external electric circuit identifies said pixel region, upon which said radioactive rays are incident, upon basis of a signal from said second electrode and a signal from one of said plurality of first electrodes.

14. The radioactive ray detector card, as described in claim 9, wherein:
said first electrode wirings, which are provided on the one surface of said substrate, and said first electrode wirings, which are provided on the other surface of said substrate, are arranged so that they do not overlap with each other when seeing through said substrate from a front surface thereof.

15. The radioactive ray detector card, as described in claim 14, wherein:

said external electric circuit identifies said pixel region, upon which said radioactive rays are incident, upon basis of a signal from said second electrode and a signal from one of said plurality of first electrodes.

16. The radioactive ray detector card, as described in claim 9, wherein:

said external electric circuit identifies said pixel region, upon which said radioactive rays are incident, upon basis of a signal from said second electrode and a signals from one of said plurality of first electrodes.

* * * * *